(No Model.)
E. L. BRILLHART.
VEHICLE SPRING.
No. 597,161. Patented Jan. 11, 1898.
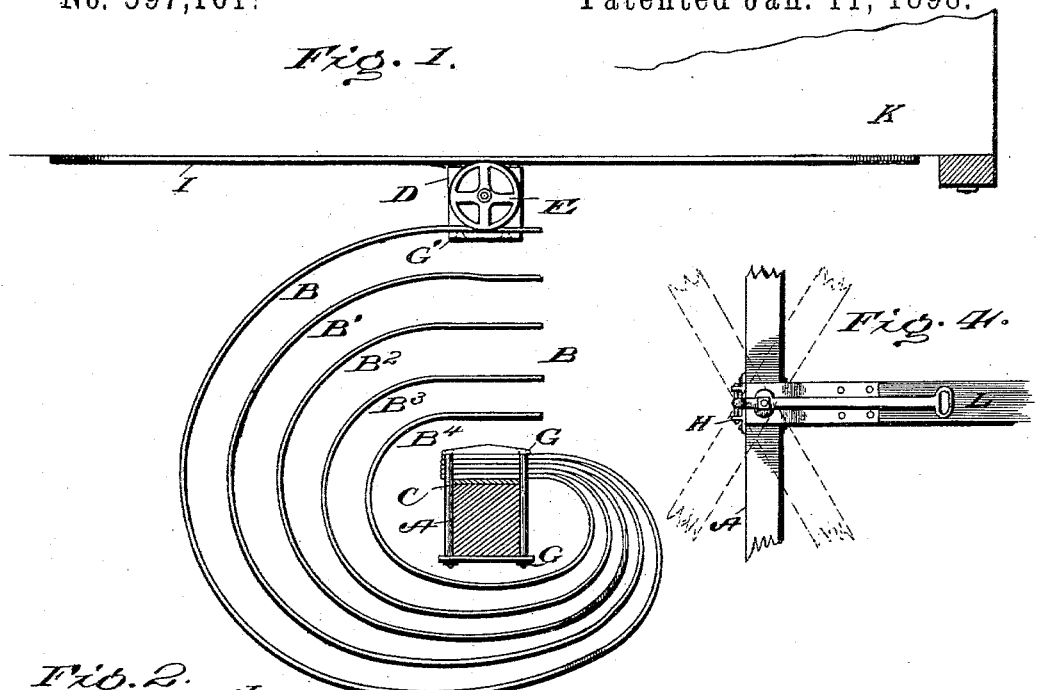
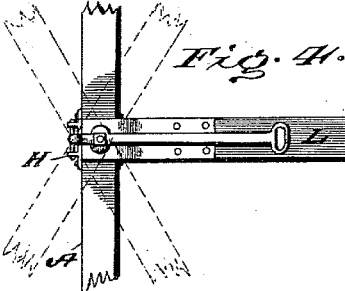
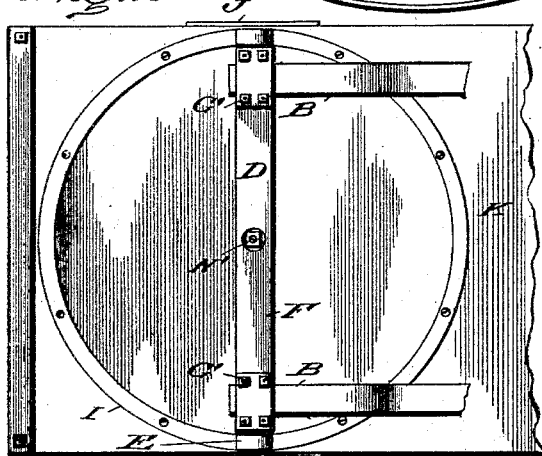
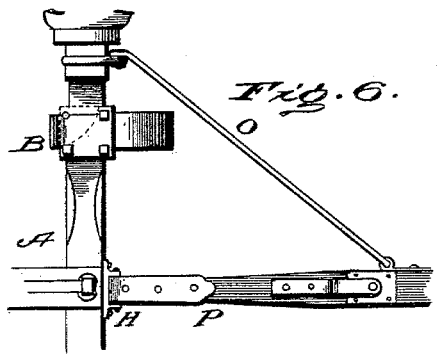
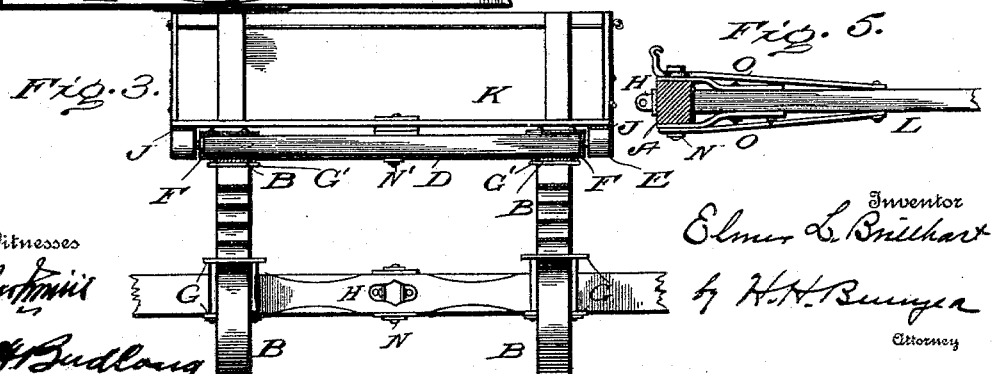
Witnesses
Inventor
Elmer L. Brillhart
by H. H. Bunyer
Attorney

UNITED STATES PATENT OFFICE.

ELMER LEWIS BRILLHART, OF PENTWATER, MICHIGAN.

VEHICLE-SPRING.

SPECIFICATION forming part of Letters Patent No. 597,161, dated January 11, 1898.

Application filed August 28, 1897. Serial No. 649,838. (No model.)

*To all whom it may concern:*

Be it known that I, ELMER LEWIS BRILLHART, residing at Pentwater, in the county of Oceana and State of Michigan, have invented certain new and useful Improvements in Running Gears for Wagons and other Vehicles, of which the following is a specification, reference being had therein to the accompanying drawings.

The object of my invention is to provide a set of composite springs for all kinds of vehicles that will be at all times adjusted to carry a very light load with the same ease of motion as it will a heavy one and always in position to impart an easy motion to the body, which is particularly essential in the conveyance of fruits and other perishable products.

The construction of my springs and gear is such as to impart a swing motion to the body by dispensing with the present bolster and stakes, through which the greater per cent. of the jar is received. The said springs can be adjusted to any vehicle, and by using two or more plies of the required thickness and width can produce the desired capacity.

The advantages and features of my invention will be more fully set forth in the description of the accompanying drawings, making a part of this specification, in which—

Figure 1 is a side elevation of one of the front springs and gear connecting the box by means of cross-pieces D to the axle. Each ply of said spring stands alone and in position to give its full length vibration and supports its proportion of the load when applied. Fig. 2 is a bottom plan view of the parts shown in Fig. 1. Fig. 3 is a front elevation showing the position of both front springs. Fig. 4 is a plan view showing the connection of pointed reach to axle. Fig. 5 is a side view of the parts shown in Fig. 4, showing the means of connecting the reach with the axle. Fig. 6 is a sectional view of tongue and axle, showing a three-fourth view of the upper plate, which exposes the position of the one bolt only, which is embedded half-way into the edge of the springs to keep the several plies in position.

A represents the axle.

B, B', $B^2$, $B^3$, and $B^4$ represent the springs, all of which are firmly bolted to the axle by means of upper and lower plates G, as shown in Figs. 1 and 3.

D represents the cross-piece, which supports the body or box and to which the upper plies of the composite springs are securely fastened by bolts and plates G to the brackets F, and so to cross-piece D, which is secured to the box by king-bolt N', but allowed to pivot on said bolt and bearings, as shown in Figs. 2 and 3.

E E represent the small rollers and are secured to the ends of cross-pieces D by long screw-bolts, the rollers journaling on said bolts and held in position to travel the fifth-wheel ring I, which is secured to the bottom of the box and by use of which imparts a very easy swing to the gear when heavily loaded, the cross-piece D and axle A being designed to swing in parallel planes by the springs, as shown in Figs. 1, 2, and 3.

L represents the reach.

N represents the king-bolt.

O represents the brace-rods for tongue and reach.

P represents the tongue.

What I claim, and desire to secure by Letters Patent, is—

1. A vehicle-spring comprising a plurality of C-shaped leaves or plates of different curvatures, and curved around the axle, one end of each of the leaves being assembled together and secured to the axle, the other end of the outer leaves being attached to the cross-piece connected to the box, substantially as described.

2. A vehicle-spring comprising a plurality of C-shaped leaves all of which are firmly secured to the axle and in combination with cross-pieces and roller-bearing to travel the fifth-wheel which is secured to the under side of the box, as and for the purpose described.

3. A vehicle-spring comprising a plurality of C-shaped leaves curved around the axle and in combination with cross-piece D, brackets F, and roller E all of which are secured by means of plates and bolts substantially as described.

In testimony whereof I affix my signature in presence of two witnesses.

ELMER LEWIS BRILLHART.

Witnesses:
CHAS. BOUGA,
BERT JEFFRIES.